United States Patent
Levin et al.

(10) Patent No.: US 7,602,514 B2
(45) Date of Patent: Oct. 13, 2009

(54) ESTIMATING THE TIME TO PRINT A DOCUMENT

(75) Inventors: Burton L. Levin, Lake Oswego, OR (US); Paul R. Henerlau, Portland, OR (US); James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 876 days.

(21) Appl. No.: 10/871,722

(22) Filed: Jun. 17, 2004

(65) Prior Publication Data

US 2005/0190383 A1    Sep. 1, 2005

Related U.S. Application Data

(60) Provisional application No. 60/549,229, filed on Mar. 1, 2004.

(51) Int. Cl.
*G06F 3/12* (2006.01)
(52) U.S. Cl. .................... 358/1.15; 358/1.1
(58) Field of Classification Search .......... 358/1.1, 358/1.15
See application file for complete search history.

(56) References Cited

U.S. PATENT DOCUMENTS

| | | | |
|---|---|---|---|
| 5,579,447 A * | 11/1996 | Salgado | 358/1.9 |
| 6,044,177 A | 3/2000 | Herley | |
| 6,115,503 A | 9/2000 | Kaup | |
| 6,186,682 B1 * | 2/2001 | Ishiyama | 400/76 |
| 6,467,087 B1 | 10/2002 | Yang | |
| 6,493,100 B1 | 12/2002 | Endo et al. | |
| 6,775,023 B1 * | 8/2004 | Fukunaga et al. | 358/1.15 |
| 6,888,641 B2 * | 5/2005 | Koana | 358/1.15 |
| 2002/0089691 A1 * | 7/2002 | Fertlitsch et al. | 358/1.15 |
| 2002/0169002 A1 * | 11/2002 | Imbrie et al. | 455/557 |
| 2003/0063305 A1 | 4/2003 | McIntyre | |
| 2003/0086107 A1 | 5/2003 | Johnson et al. | |
| 2003/0097426 A1 | 5/2003 | Parry | |
| 2003/0184799 A1 * | 10/2003 | Ferlitsch | 358/1.15 |
| 2003/0184813 A1 * | 10/2003 | Kobayashi et al. | 358/426.01 |

FOREIGN PATENT DOCUMENTS

| | | | |
|---|---|---|---|
| GB | 2348987 | | 10/2000 |
| JP | 1134148 | | 5/1989 |
| JP | 09244826 A | * | 9/1997 |
| JP | 10269107 | | 10/1998 |
| JP | 11161445 | | 6/1999 |

* cited by examiner

*Primary Examiner*—Twyler L Haskins
*Assistant Examiner*—Fred Guillermety
(74) *Attorney, Agent, or Firm*—Chernoff, Vilhauer, McClung & Stenzel

(57) ABSTRACT

A system for estimating the time to print a document on a printer.

40 Claims, 2 Drawing Sheets

ESTIMATING THE TIME TO PRINT A DOCUMENT

CROSS-REFERENCE TO RELATED APPLICATIONS

This application claims the benefit of U.S. Provisional Patent Application No. 60/549,229, filed Mar. 1, 2004 as ESTIMATED TIME TO PRINT A DOCUMENT.

BACKGROUND OF THE INVENTION

The present invention relates to estimating the time to print a document on a printer.

Referring to FIG. 1, conventionally a printing system comprises a computer and a plurality of printers accessible through a communication network such as a LAN (Local Area Network) or a system bus of the computer; one or more printers interconnected to a computer which is in turn interconnected to a communication network and accessible to other computers; or one or more printers interconnected to a computer in any manner. In many cases, the file to be printed is spooled on a dedicated print server on the communication network; spooled on another computer on the communication network; or otherwise spooled on the user's computer. The user selects from among one or more printers for printing the file. Thus, the user selects a printer, which has been determined by the user as optimum, from among the many printers. In other cases, the user's computer, another computer, or the print server selects a suitable printer.

The typical data flow for printing a document includes the user's application printing a document using a printer driver. The printer driver creates document data that includes a printing command train for describing the printing content of characters, figures, and images with respect to each page of the document. The document data is then passed to the print server which stores the document data as a file using a spooler. The print server then reads the file and transmits it to the printer. The printer, in turn, processes the received document and executes the printing to paper. The user's application, printer driver, and print server may be on the same computer, if desired.

Existing technology may allow the user to view the number of print jobs assigned to a given printer, along with the size of the files queued to be printed. This may be used to provide an initial estimate of the time to print a given file. The limitation of such existing technology is that it does not take into account different print job characteristics, which could greatly effect the actual printing time. For example, a small sized job which is printing many copies may take longer to print than a substantially larger sized job printing only a single copy. Another example, is a print job with a lot of graphical data that may take longer to print than a file which is primarily text.

In most cases there are a variety of different types of printers from the same or different manufacturer and different models of the same type of printer from the same or different manufacturer. Therefore, the performance and printing characteristics of each of the printers differs in many respects. For example, ink jet printers typically have a slower print speed than laser printers, and each has a variety of different printing resolutions. In order for the timely printing of documents the user should have an understanding of the time it is going to take to print a particular document on a particular printer using a set of particular settings. For example, to print a 100 page color document for presentation, a color printer should be selected and, if the document is urgently needed for a trial or other pending deadline, the user should select a relatively fast color printer. In addition, the time to print affects the productivity of the user who may be required to wait a significant amount of time because of a large print queue of previous documents or a relatively slow printer. Moreover, completing a print job faster means that the entire printing system of printers may achieve a higher utilization, thereby, avoiding having some jobs queued up on a printer while other, even slower printers are idle.

In most situations, the software application in combination with the printer driver for the selected printer processes the data to be printed and creates a command train containing instructions for the printer, which is spooled into a file by the print server. The file may be in a variety of different formats, such as for example, a raster type format or a postscript type format. The spooled file is then provided to the printer in a suitable manner so that the printer can interpret the spooled file and print the document in the intended manner. When another files is printed to the same printer before the previous file has completed printing, the print server queues the additional file for printing after the previous file has completed printing. In many cases there are multiple files awaiting printing in the print queue.

In many cases the user may view a list of the queued files on the print server. In addition to viewing the list, the user is typically provided with the size of the files that are queued. However, merely viewing the sizes of the files in the queue leaves the user at a loss as to approximately how long it is going to take for the particular files to be printed on the particular printer.

Information as compiled today, such as the number of files and file sizes in the queue, might be used by the print server to provide an estimated time for the document to print or to provide an estimate of the progress of printing the file on the on the printer.

The information available in the queues of multiple printers can be accessed concurrently. Therefore, the estimated time may be presented for a plurality of different printers accessible by the printer server. Unfortunately, the conversion from file size to estimated printing time is not very accurate for many files, especially considering some files contain primarily text, some files contain primarily graphics, some are photo, and some files contain a combination of text, photo, and graphics, all which may be printed at different resolutions on the same printer.

DETAILED DESCRIPTION OF THE PREFERRED EMBODIMENT

The gathering of the statistics can be performed by the printer driver or the operating system, either of which may do the actual image processing. The example of the preferred embodiment described below is not intended to exclude a similar implementation in the operating system, a printer driver, or a sharing of the image processing and statistical gathering between the two.

Figure 1:
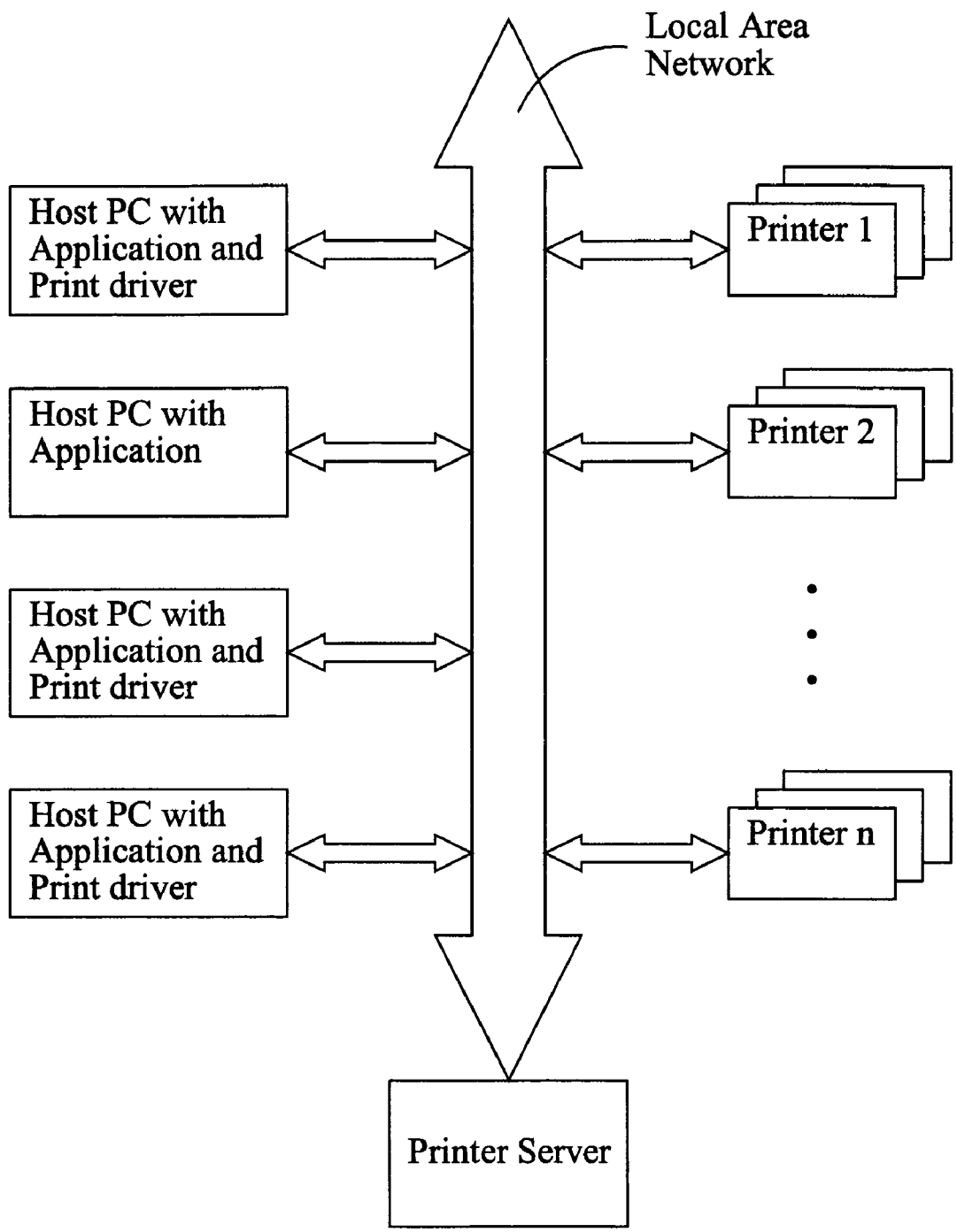
FIG. 1 illustrates a system with computers, network, printers, and a print server.
Figure 2:
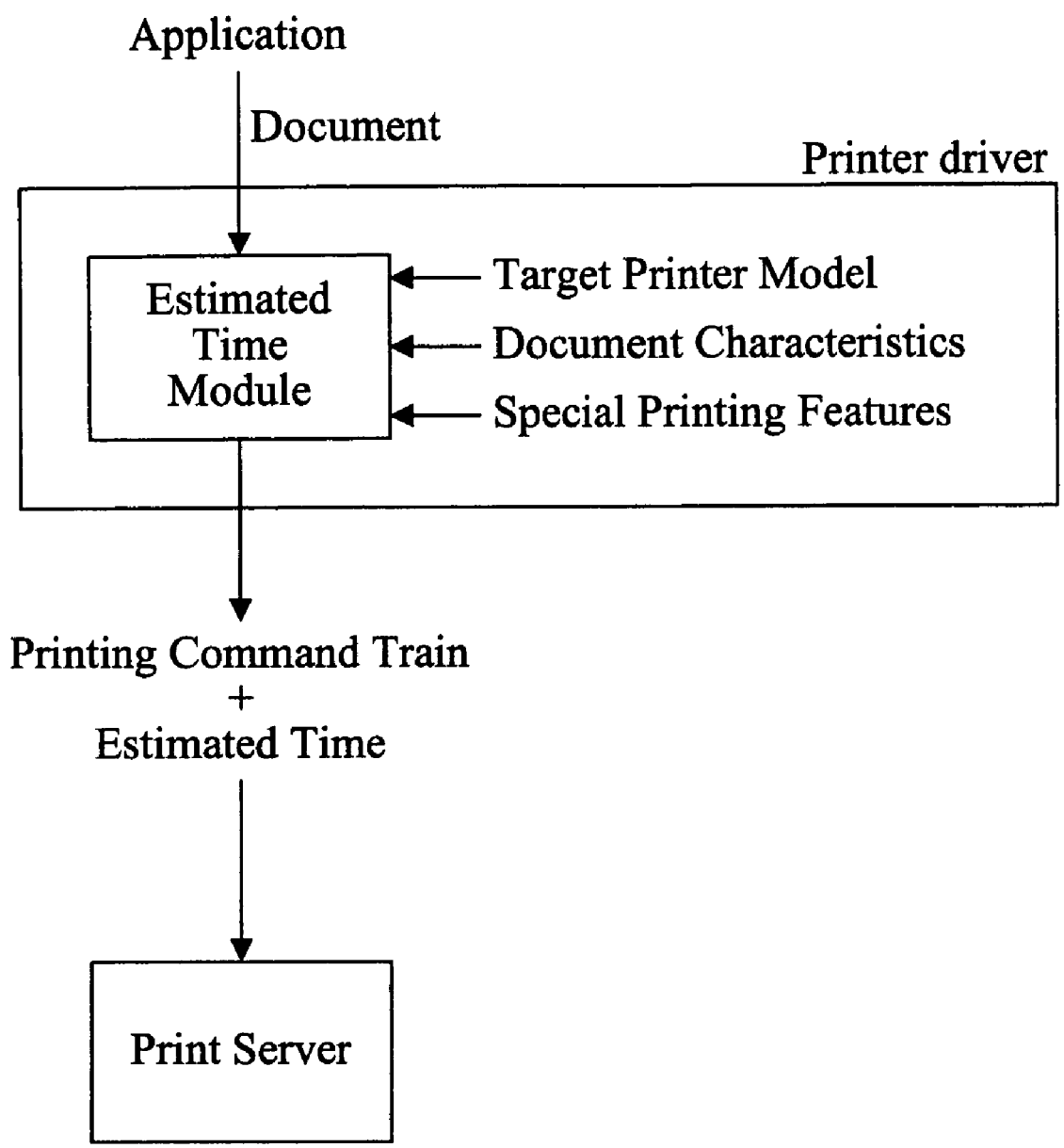
FIG. 2 illustrates a print time estimation system with an application, a printer driver, statistical measures, time estimation, print server, and a printer.

Referring to FIG. 2, the present inventors observed that the processing of data within the printer driver includes information which may be used, at least in part, as the basis to estimate the time necessary to print a file. For example, the printer driver processes the information from the application to create a variety of printer description language commands, drawing objects, and/or raster images. During the process of creating the printer description language commands, drawing objects, and/or raster images by the printer driver, or otherwise a process associated with the printer driver which is still considered the printer driver, statistics may be compiled regarding the resulting printing command train with minimal impact on the printing process. The gathered statistics from the printer driver may then be used to estimate a time to print the document on the printer. This estimation of the time to print the document may be based upon comparing the statistics for the particular document with a target printer model. The target printer model may include a profile of the class of printers in the print spool so that particularized estimations may be created. The estimated print time may then be provided to the print server together with the printer command train. Alternatively, the estimated print time may be provided to the print server separate from the printer command train. Also, the print server may calculate the estimated print time. Also, the estimated print time may be calculated by the printer driver (or process associated with the printer driver) in combination with the print server.

The estimated print time at the print server may be used to provide an indication to the user of the estimated time to print the document. For example, the user may examine the print queue for a particular printer and determine the time necessary to print the currently pending jobs so that the user will know when the previously pending print jobs will be completed and, therefore, when the new print job will start printing. Also, the user may examine the print queue for a particular printer and determine that the time necessary to print the new print job, which could be thousands of pages long. In the case that the new print job will take too long to print on the particular printer, it may be canceled by the user and reprinted on a more suitable printer. Alternatively, the print server itself may redirect to another printer based on the estimated print time from the driver and the status of queues in the various printers.

The estimated print time may likewise be used to select an appropriate printer, from a plurality of available printers, to print the file on. The printer selection may be based upon the size of the queue itself, the files in the queue for each particular printer, the speed of each printer, the print job(s) already in process being printed on any particular printer, the capabilities of each available printer, etc. The selection of the appropriate printer may likewise be modified, as the state of the print queue changes as a result of, for example, printing files or otherwise a change in the priority of files in the print queue.

After considering a significant number of potential characteristics related to printing documents, the present inventors determined the there are three primary characteristics that are most useful in determining the time to print a document. A combination of one or more aspects of one or more of the primary characteristics may be used to estimate the time to print a document for the printer model selected by the user.

The first type of characteristics that are useful in determining the time to print a document include those which make up the print image. The print image includes, for example, one or more of the following characteristics:
The number of text characters to be transmitted to the printer;
It is noted that the number of text characters relates to the time it will take to print a particular file.
Text as graphics;
It is noted that printing text as graphics has a print time characteristic.
Text as fonts;
Download fonts to the printer;
It is noted that it may take substantial time to download fonts to the printer and different fonts may take a different times to download. In addition, different fonts may take a different amount of time to print. It is noted that the time to process a single page composed of representative fonts may be used as a time basis for non-resident fonts.
Use fonts resident in the printer;
It is noted that it may not take a significant amount of time to access the fonts in the printer. In addition, different fonts may take a different amount of time to print. It is noted that the time to process a single page composed of representative resident fonts may be used as a time basis for resident fonts.
Time for specific printer model to access resident fonts in the printer;
It is noted that it may take time to access resident fonts in the printer.
Number and length of scan lines;
It is noted that the number and length of scan lines is related to the time to print. It is noted that the time to process a single page composed of all scan lines, where each line is the full width of the page, may be used as a time basis for less than a full page.
Number and size of graphical objects;
It is noted that the number and size of graphical objects is related to the time to print.
Photo regions;
It is noted that photo regions may require substantial time to print. It is noted that the time to process a single page composed of representative bitmaps may be used as a time basis for photo regions.
Graphics Regions;
It is noted that graphic regions may require substantial time to print, but may be a different time than the photo regions. Graphics regions generally relate to business related graphics which are frequently created using vector descriptions. It is noted that the time to process a single page composed of representative graphic regions may be used as a time basis for graphics regions.
Page size;
It is noted that the page size is related to the time necessary to print.
File size for the entire document;
It is noted that the file size for the entire document is related to the time to print.
Compression scheme;
It is noted that the compression scheme is related to the time to print.
Raster mode;
It is noted that the raster mode is related to the time to print.
Vector mode;
It is noted that the vector mode is related to the time to print;
The second type of characteristics that are useful in determining the time to print a document include any special printing features that are selected. The special features includes, for example, one or more of the following characteristics:

Number of pages in the document;
 It is noted that the number of pages has a significant impact on the time needed to print a document.

The choice of plain printing, no booklet printing nor pamphlet printing;
 It is noted that some printers have different printing speeds depending on the choice of printing.

N-up printing;
 It is noted that some printers have significantly slower n-up printing speeds. For example, a measurement may be made of the throughput when printing N-up documents.

Number of copies;
 It is noted that is takes additional time to print each copy of a document.

Text and graphics vs. images
 It is noted that most text and business type graphics (e.g., charts, bar graphs) encode into a minimal amount of information in comparison to images (e.g., photographs) which tend to encode into a large amount of information.

Complexity;
 It is noted that the complexity of the document is related to the time needed to print the document.

Language (PCL, PS, RAW, etc.);
 It is noted that the different languages may take different amounts of time for the printer to interpret or otherwise process the information.

Duplex printing;
 It is noted that some printers have a significantly slower duplex printing capability than single sided printing (times two). For example, a measurement may be made of the throughput when printing duplex documents.

Booklet printing;
 It is noted that some printers have a significantly slower booklet printing capability. For example, a measurement may be made of the throughput when printing booklet documents.

Pamphlet printing.
 It is noted that some printers have a significantly slower pamphlet printing capability. For example, a measurement may be made of the throughput when printing pamphlet documents.

The third type of characteristics that are useful in determining the time to print a document include a model of the printers with attributes that affect the printing time. These attributes may include, for example, ink jet printers versus laser jet printers. Also, for ink jet printers there are regions of the page where data does not need to be created. Some of these areas result in blank lines and partial lines to be printed on the page. Such blank lines and partial lines may be considered in the computation of the time to print a document because no data (or very limited data) needs to be generated, processed, compressed, transmitted to a printer, uncompressed, or printed for these areas of the page. In this manner, the time to print a document on an ink jet printer is less than it would have otherwise been had the page been full of text. It is noted that the third type of characteristics may be performed by the print server or the printer driver, with or without the first two characteristics.

The print server may select the actual printer from among available printers for printing of the documents. The actual time may be accounted for in the print server because the print server may have access to several printers of the same model family, but with different performance or hardware options available, such as, the amount of RAM, speed of the paper path (PPM), or hardware duplexer and sorters. Therefore, the printer driver (or associated program) includes approximations prior to providing the document to the print server. The print server may make adjustments for each of the printers and make the assignment of the print job to a specific printer.

One potential system configuration is for the printer driver to presume that the most efficient printer configuration is used for the particular printer model when computing the time to print estimate. The print server may make an adjustment to the time to print based on the print server's choice of a specific printer or otherwise more information about the particular selected printer. For example, the print server may determine if the specific printer has a duplexer, available of firmware journaling, firmware collation, stacking, etc.

Performance data for each model of family of printers is available to the printer driver together with weighting factors for their various configurations. The data may be derived by printing a set of documents specifically designed to measure the time to process each item listed. The weighting factors can then be computed for the each element. Also, the weighting factor may be different depending on where the printing capability is provided, such as, in software or printer firmware.

An example of some of the weighting factors may be one or more of the following:

| | |
|---|---|
| PDX | Pages per minute throughput when printing duplex documents. |
| PDB | Pages per minute throughput when printing in booklet format. |
| PNUPn | Pages per minute throughput when printing n-up. |
| WSL | Time to process a single page composed of all scan lines, where each line is the full width of the page, e.g., time/maximum number of scan lines for a page. |
| WBM | Time to process a single page composed of a set of representative bitmaps. |
| WRT | Time to process a single page composed of different fonts, all resident in the printer. |
| WDT | Time to process a single page composed of different fonts, all requiring downloading to the printer. |
| WGO | Average time to process a single page composed of representative geometric objects. |

In many cases, especially under a Windows operating system with compatible drivers, the print server creates a printing command train that is provided to the print server, which in turn creates a .prn file type. One technique to determine the printing statistics includes using a set of counters, each of which count the occurrence of a specified event. The specified event may include any suitable event, such as for example, the number of times a particular image object is created, the creation of textual graphics, and the number of lines to be printed. The system can gather the statistics in real-time, thereby, not significantly increasing the time to print.

The counting may include one or more of the following events.

| | |
|---|---|
| CBM | Count of the number of bitmaps to be sent to the printer; |
| CRT | Count of the number of characters of text for fonts that are resident in the printer, per page. |
| CDT | Count of the number of characters of text for fonts that are downloaded to the printer. |
| CGO | Count of the number of geometric objects to be downloaded: circles, rectangles, etc. |

| | -continued |
|---|---|
| CSL | Count of the number of scan lines in a page. |
| NPG | Number of pages in a single copy of the document. |
| NCP | Number of copies of the document to print. |
| TPG | Total number of pages to print. |

Using these "counts" the time to print by the printer driver maybe estimated as follows. For each page "k" (from 1 through NPG), the relative time to print one copy is as follows:

$$Tpage_k = (CSL_k * WSL) + (CBM_k * WBM) + CRT_k * WRT) + (CDT_k * WDT) + (CGO_k * WGO).$$

The relative time to print, TDOC, to print the entire document may be calculated using one (or more) of the following exemplary equations.

$$TDOC = \sum_{k=1}^{NPG} Tpage_k$$

Where TDOC is time to print if no special finishing options are selected.

$$TDOC = PNUPn * \sum_{k=1}^{NPG} Tpage_k$$

Where TDOC is time to print a booklet or n-up printing performed by printer firmware.

$$TDOC = PDX * \sum_{k=1}^{NPG} Tpage_k$$

Where TDOC is time to print for duplex printing.

$$TDOC = PDX * PNUP_n * \sum_{k=1}^{NPG} Tpage_k$$

Where TDOC is time to print for booklet, pamphlet, or n-up, and duplex printing performed in the printer firmware.

The total relative time to print the entire print job may be as follows:

Estimated Time=$TDOC*NCP$

In some embodiment the preferred embodiments address printing deficiencies by providing metrics of the characteristics of a print job, and using that information along with the performance profile of a printer for those characteristics in estimating the time to print a document. The time estimate can be used to estimate the job for any of several identical printers. Alternatively, the time estimate can be used as a reference value to be applied to each one of a plurality of similar printer, each identical except for the actual printing speed. Therefore, this in turn can be used to determine the most appropriate assignment of a job to a printer.

The invention claimed is:

1. A method for estimating the time to print a document comprising:
    (a) a printer driver receiving a document to be printed on a selected one of a plurality of printers
    (b) said printer driver creating printer document data based upon said document and said plurality of printers;
    (c) said printer driver creating respective sets of statistics related to an estimated time to print said document on at least two of said plurality of printers, each of said respective sets of said statistics based upon a model of a respective said plurality of printers;
    (d) said printer driver spooling said printer document data into a file for printing on said printer;
    (e) said printer driver estimating a time for printing the entire said document on each of said plurality of printers based upon said sets of statistics and upon a respectively calculated estimated time of completion of any print jobs being currently performed by each of said plurality of printers; and
    (f) transmitting the respective said estimated times for printing said document to a print server that modifies the respectively estimated said times received from said print driver for printing said document and automatically selects a printer to print the entire said document based on the modified said estimated times.

2. The method of claim 1 wherein said document is created on a first computer.

3. The method of claim 2 wherein said printer driver is on said first computer.

4. The method of claim 3 wherein said spooling is by said print server.

5. The method of claim 4 wherein said print server is on a second computer interconnected to said first computer by a network.

6. The method of claim 5 wherein said printer is interconnected to said network.

7. The method of claim 4 wherein said print server is on said first computer.

8. The method of claim 7 wherein said printer is interconnected to said first computer.

9. The method of claim 1 wherein said time is provided together with said printer document data.

10. The method of claim 1 wherein said time is provided separately from said printer document data.

11. The method of claim 1 wherein said time is modified by a process other than said printer driver.

12. The method of claim 1 wherein each of said sets of statistics includes an indication of lines of text to be transmitted to said printer.

13. The method of claim 1 wherein each of said sets of statistics includes an indication of text as graphics to be transmitted to said printer.

14. The method of claim 1 wherein each of said sets of statistics includes an indication of text fonts to be transmitted to said printer.

15. The method of claim 1 wherein each of said sets of statistics includes an indication of text fonts resident in said printer.

16. The method of claim 1 wherein each of said sets of statistics includes an indication of the number of scan lines to be transmitted to said printer.

17. The method of claim 1 wherein each of said sets of statistics includes an indication of the scan line to be transmitted to said printer.

18. The method of claim 1 wherein each of said sets of statistics includes an indication of the length of at least one scan line to be transmitted to said printer.

19. The method of claim 1 wherein each of said sets of statistics includes an indication of the number of graphical objects to be transmitted to said printer.

20. The method of claim 1 wherein each of said sets of statistics includes an indication of the size of graphical objects to be transmitted to said printer.

21. The method of claim 1 wherein each of said sets of statistics includes information regarding bit mapped regions to be transmitted to said printer.

22. The method of claim 1 wherein each of said sets of statistics includes an indication of page size for said printer.

23. The method of claim 1 wherein each of said sets of statistics includes an indication of file size to be transmitted to said printer.

24. The method of claim 1 wherein each of said sets of statistics includes an indication of compression scheme to be transmitted to said printer.

25. The method of claim 1 wherein each of said sets of statistics includes an indication of a raster mode of printing.

26. The method of claim 1 wherein each of said sets of statistics includes an indication of a vector mode of printing.

27. The method of claim 1 wherein each of said sets of statistics includes an indication of the number of pages in said document to be transmitted to said printer.

28. The method of claim 1 wherein each of said sets of statistics includes an indication of booklet printing for said printer.

29. The method of claim 1 wherein each of said sets of statistics includes an indication of pamphlet printing for said printer.

30. The method of claim 1 wherein each of said sets of statistics includes an indication of n-up printing for said printer.

31. The method of claim 1 wherein each of said sets of statistics includes an indication of the number of copies for said printer.

32. The method of claim 1 wherein each of said sets of statistics includes an indication of printer language for said printer.

33. The method of claim 1 wherein each of said sets of statistics includes an indication of duplex printing to be transmitted to said printer.

34. The method of claim 1 wherein each of said sets of statistics includes an indication of a hardware option of a respective said printer.

35. The method of claim 34 wherein said hardware option is provided by said print server.

36. The method of claim 35 wherein said hardware option includes the amount of RAM of a respective said printer.

37. The method of claim 35 wherein said hardware option includes the speed of the paper path.

38. The method of claim 35 wherein said hardware option includes a duplexer for a respective said printer.

39. The method of claim 35 wherein said hardware option includes a sorter for a respective said printer.

40. A method for estimating the time to print a document comprising:
(a) receiving a document to be printed on one of a plurality of printers by a printer driver;
(b) creating printer document data by said printer driver based upon said document and said printer;
(c) said printer driver creating a first estimated time to print said document using statistics comprising print image characteristics of said document, print features including the number of pages in said document, and respective printer model characteristics for each of said plurality of printers having attributes relating to printer operation;
(d) spooling said printer document data into a file for printing on one of said plurality of printers;
(e) a print server creating a second estimated time to print said document based upon a modification of said first estimated time; and
(f) selecting, automatically and without user input, one of said plurality of printers to print the entire said document based upon said time estimated in step (e).

* * * * *